J. J. HANUS.
COTTON GIN.
APPLICATION FILED JUNE 25, 1920.
1,403,774.
Patented Jan. 17, 1922.
3 SHEETS—SHEET 2.
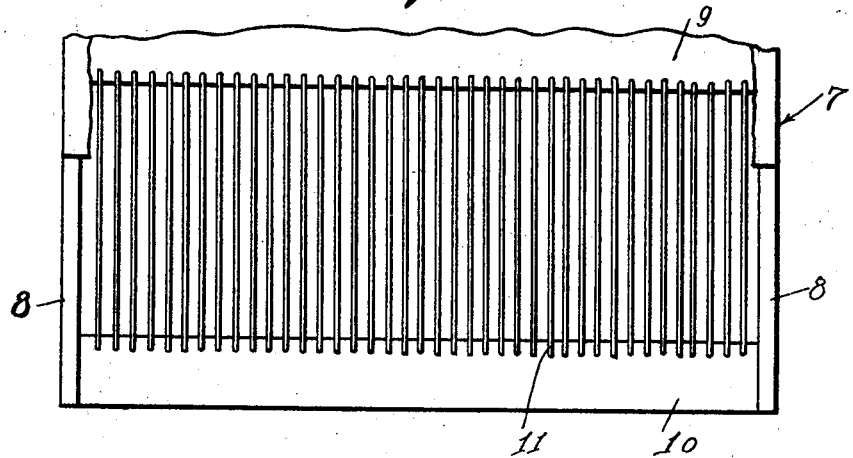
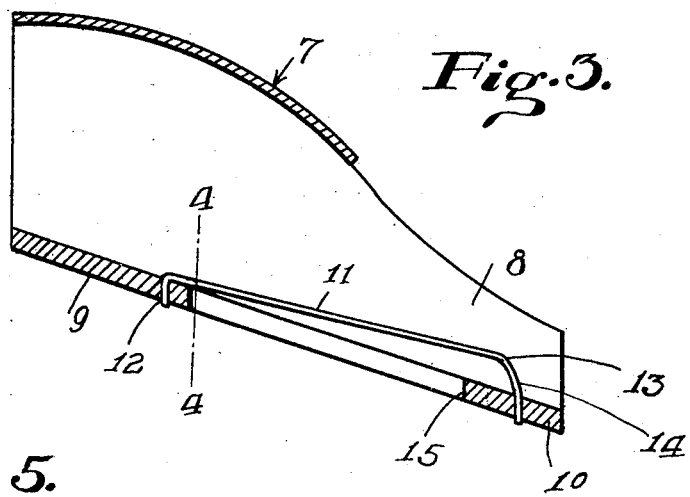
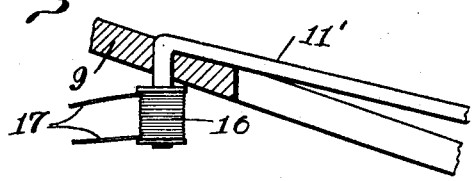
Inventor
J. J. Hanus.
By C.A. Snow & Co.
Attorneys

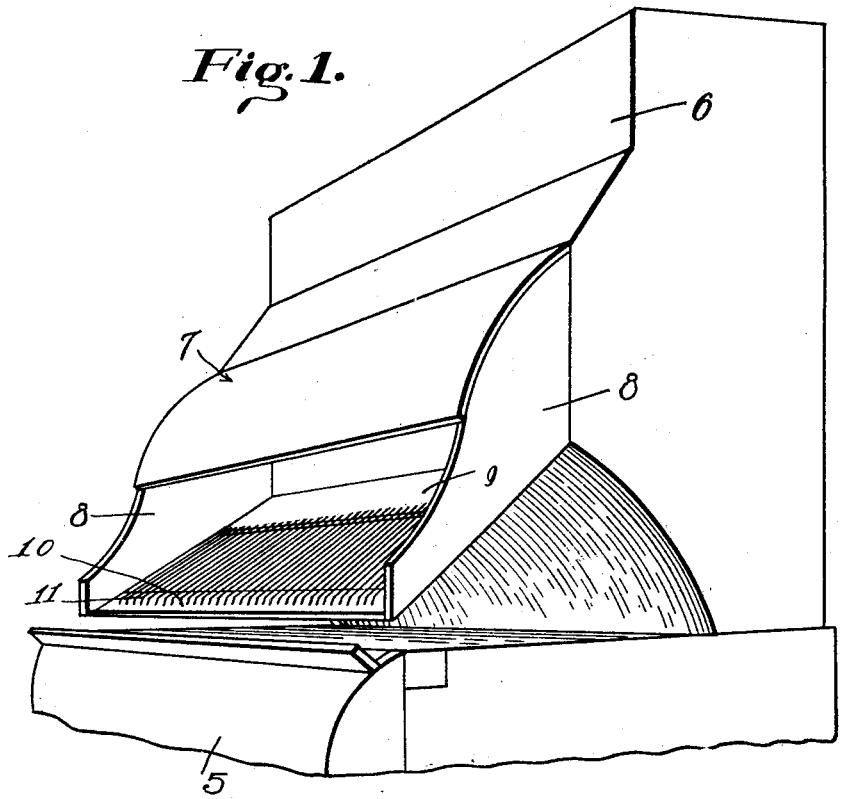
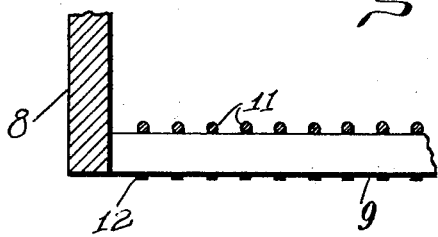

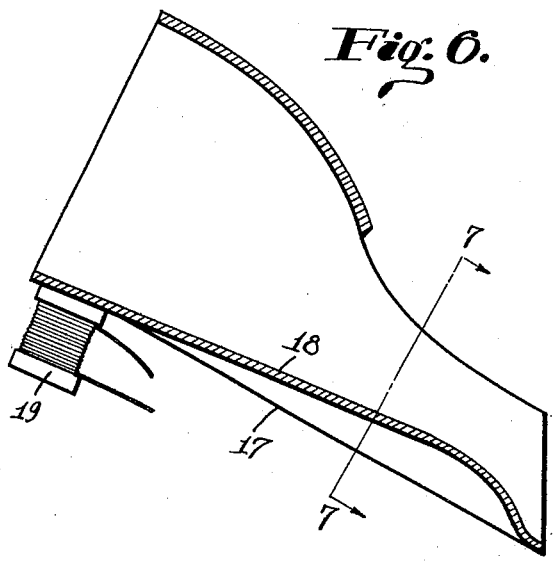
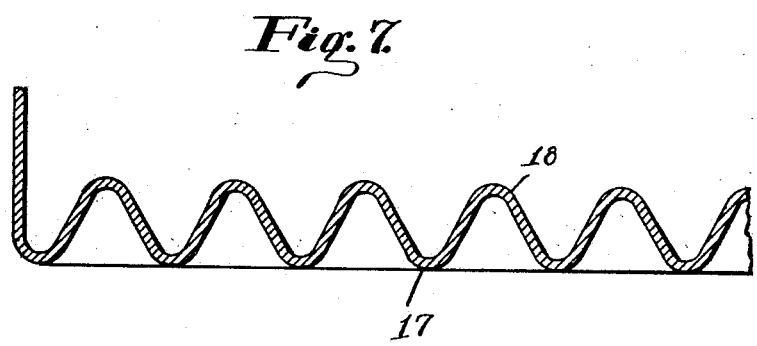

UNITED STATES PATENT OFFICE.

JOSEPH J. HANUS, OF ENNIS, TEXAS.

COTTON GIN.

1,403,774.  Specification of Letters Patent.  Patented Jan. 17, 1922.

Application filed June 25, 1920. Serial No. 391,702.

*To all whom it may concern:*

Be it known that I, JOSEPH J. HANUS, a citizen of the United States, residing at Ennis, in the county of Ellis and State of Texas, have invented a new and useful Cotton Gin, of which the following is a specification.

This invention relates to cotton ginning machinery and more particularly to a cleaning feeder and has for its object the provision of an apron between the feeder and the gin stand that will separate particles of dirt and trash from the cotton as it passes over the apron from the feeder to the gin saws.

Another object is the provision of an apron that will convey the cotton from the feeder to the gin saws in a uniform layer. Novel means also being employed for preventing lodgment of the cotton in its passage from the feeder to the gin.

With these and other objects in view which will appear as the description proceeds the invention resides in the novel combination and arrangement of parts hereinafter described and claimed. It being understood that minor changes may be made within the scope of what is claimed without departing from the spirit of the invention or sacrificing any of the advantages thereof.

In the drawing forming a part of this specification:

Figure 1 illustrates in perspective a portion of a gin stand and cleaning feeder with my invention applied thereto;

Figure 2 is a view in elevation of the device;

Figure 3 is a longitudinal sectional view of the same; and

Figure 4 is a detail sectional view taken on line 4—4 of Figure 3;

Figure 5 is a fragmental view showing a modification of the device;

Figure 6 is a longitudinal section through a further modified form of the invention;

Figure 7 is a transverse sectional view taken on line 7—7 of Figure 6.

Referring to the drawings by characters of reference in which like numerals refer to corresponding parts throughout the several figures of drawing, the numeral 5 designates a gin stand, and 6 a cleaning feeder; since both are of ordinary and well known construction a detailed description is thought unnecessary.

Heretofore the apron used in conveying cotton from the feeder to the gin has been constructed with a solid smooth bottom so that any trash loosened from the cotton locks by the cleaner feeder and not removed thereby is passed to the gin saws with the cotton and finally deposited with the seed. Further it has been found in practice that a feeding apron with a smooth bottom permits the cotton in its passage from the feeder to the gin to bunch or gather toward the center of the apron, so that a uniform feed is not delivered to the gin saws, resulting in an uneven roll in the roll box and consequently poor results in ginning. It is within the province of the present invention to avoid the above enumerated disadvantages.

A separator apron 7 having side walls 8 connected at opposite ends by cross members 9 and 10 is provided to take the place of the ordinary closed bottom apron. The separator 7 having a series of longitudinally extending spaced bars or ribs 11, anchored as indicated at 12 to the cross bars 9 and 10. The bars 11 are spaced so that the cotton locks will gravitate from the feeder to the gin stand, and sticks and dirt drop through between the bars.

The bars 11 are approximately flush with the top of the bar 9, are inclined upwardly, with respect to the apron to a point above the board 10 where they are given an abrupt downward turn at 13, the portion 14 of the bars serving to space the bars above the cross member 10; the bend 13 in the bars is located beyond the edge 15, of the bar 10 so that any portion of a cotton lock that may project below the bars 11 will not become lodged against the edge 15 and choke the steady flow of cotton to the gin, but will be carried over the said edge 15 and be deposited on the cross member 10 and then slide into the gin stand.

Figure 5 illustrates a slight modification in which the bars 11' are each provided with an electromagnetic coil 16, current being delivered from any suitable source to the coil by means of wires 17; in this way the bars 11 may be magnetized so that any pieces of metal that may pass over the bars will be attracted thereby and prevented from entering the gin to cause breakage of the gin saws.

Fires sometimes originate in a ginnery by reason of matches carried to the gin saws in the cotton and being ignited by a saw, this will be avoided in the present invention since articles of this kind will fall from the cotton before being delivered to the gin.

It will thus be seen that an apron constructed as above outlined will deliver the cotton to the gin stand in the same uniform layer that comes from the feeder, the ribs 11 preventing shifting of the cotton to the center of the gin stand, also permitting small particles of dirt to separate from the cotton in its passage from the feeder to the gin.

In Figures 6 and 7 a solid bottom 17 is provided having ribs 18 formed thereon. The bottom 17 is constructed of metal, so that the same may be magnetized, an electromagnet 19 being connected thereto for this purpose.

Having thus described the invention what is claimed is:

1. The combination with a cleaner feeder and a cotton gin stand, of a separator comprising longitudinally spaced bars for connecting the outlet of the feeder with the inlet of the cotton gin stand, the said bars discharging material directly into the gin stand.

2. The combination with a cleaner feeder and a cotton gin stand, of a separator comprising longitudinally spaced parallel ribs over which material is conveyed by gravity from the feeder directly into the gin stand.

3. The combination with a cleaner feeder and a cotton gin stand, of a separator comprising longitudinally spaced parallel ribs whereby material is conveyed by gravity from the feeder to the gin stand and means for magnetizing the ribs whereby metallic substances will be attracted and separated from the material.

4. In a separator apron, a frame, longitudinally extended spaced parallel bars secured at one end to the frame and extending upwardly with respect to the frame toward their other end and having an abrupt downward turn to meet the frame.

In testimony that I claim the foregoing as my own, I have hereto affixed my signature in the presence of two witnesses.

JOSEPH J. HANUS.

Witnesses:
  J. ORAN CARTER,
  ROY THOMPSON.